United States Patent Office.

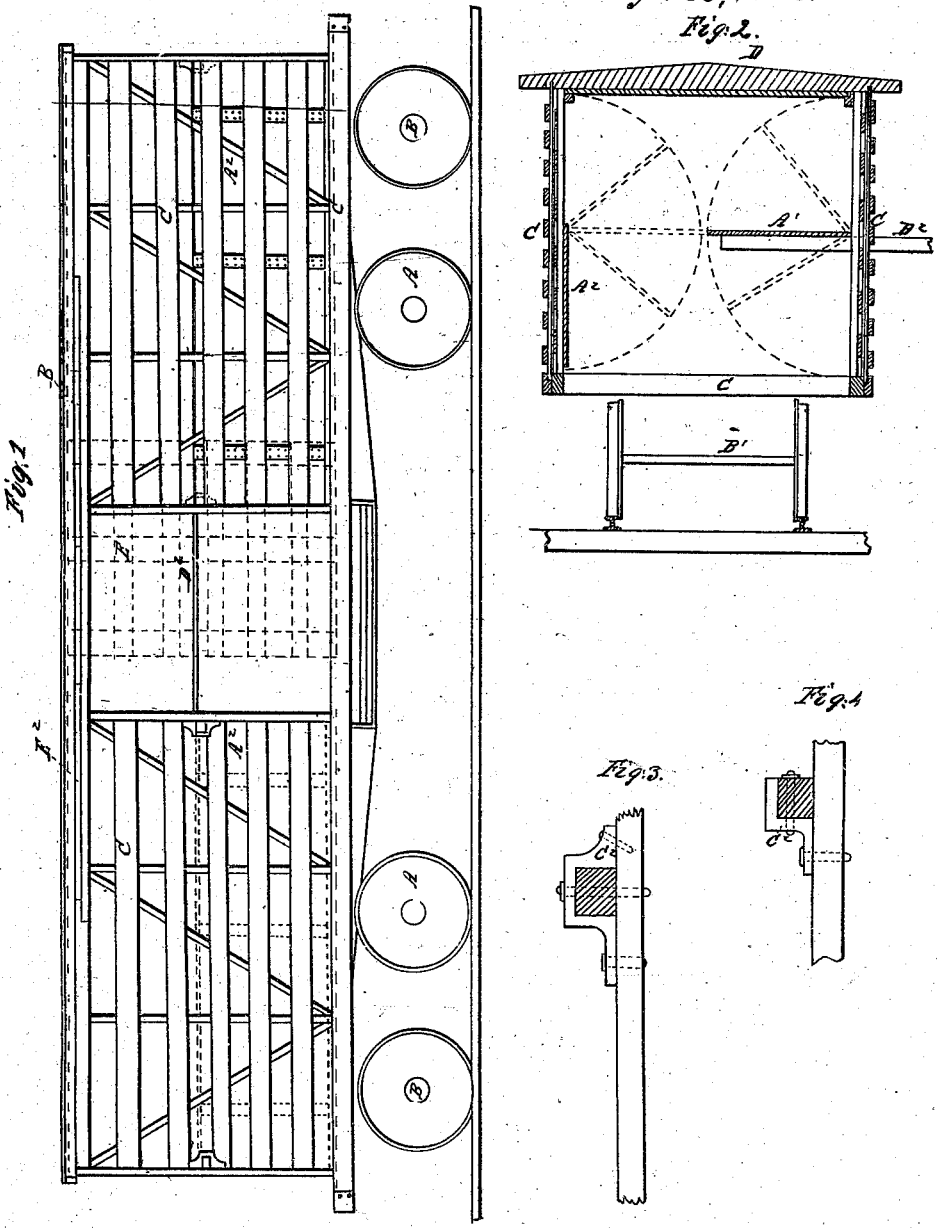

GEORGE R. BLANCHARD, OF BALTIMORE, MARYLAND.

Letters Patent No. 81,468, dated August 25, 1868.

IMPROVED RAILWAY STOCK-CAR.

*The Schedule referred to in these Letters Patent and making part of the same.*

TO ALL WHOM IT MAY CONCERN:

Be it known that I, GEORGE R. BLANCHARD, of Baltimore, in the county of Baltimore, and State of Maryland, have invented a new and useful Improved Stock-Car for Railroads; and I do hereby declare that the following is a full, clear, and exact description of the same, reference being had to the annexed drawings, making part of this specification.

My invention relates to that class of cars familiarly known to railroad-men as "double-deck stock-cars," but which are readily convertible into single-deck cars, for the purpose of adapting them to the transportation of ordinary kinds of freight.

It has long been a desideratum with the proprietors of railroads to procure a car, which should possess all the characteristic advantages of a "double-deck" car, for the transportation of the smaller kinds of animals, such as hogs, sheep, calves, &c., and, at the same time, be readily convertible into a "single-deck" car, for the transportation of ordinary kinds of freight, and which should at the same time possess all the advantages of that kind of car.

It will be apparent, that when the "upper deck" is permanently attached to the framework of the car, occupying, as it does, a position about midway of the car, its usefulness for the transportation of the larger kinds of animals, and for other kinds of freight, is seriously impaired, if not entirely destroyed. On the other hand, the advantages of a car having the features above named will be readily apparent, as it may be loaded at any point on the line, with any freight usually carried in such cars, and taken to any other point, where it may be readily transformed into a car for the reception and transportation of animals of the kind above named, or for any other purpose to which it may be adapted when thus arranged.

The production of a car possessing the above-enumerated advantages is the object of my invention, which consists in a divided platform or "upper deck" of a car, divided at or near its centre longitudinally; the sections being hinged or otherwise fastened to the sides of the car, in such a manner that, when not in use as a deck, they each swing or drop down upon its respective side of the car, thus leaving the car in condition to receive any kind of freight with which it may be desirable to load it.

The invention further consists in providing a section of the deck, which is separated from the swinging portions, for a space equal to the width of the car above, which is so constructed that it may be removed from its position, or replaced therein independent of said swinging portions.

The invention further consists in recesses, formed upon or near the roof of the car, for the reception of the section of the deck, which occupies the central position, or the space exposed by opening the doors of the car.

The invention further consists in the arrangement of the devices for holding said deck in position when in use.

In the annexed drawings—

Figure 1 shows a side elevation of a stock-car.

Figure 2 shows an end view of the same, with one section of the swinging deck in position, while the opposite section is shown as dropped down by the side of the car.

Figure 3 shows a side elevation of the rest or support for the ends of the beams, upon which the deck rests when in position, together with an end view of such beam.

Figure 4 shows a modification of the rest or support above referred to.

Similar letters denote corresponding parts in the several figures.

A denotes the wheels, B the axle, C C C the bottom and sides, D the roof, and E the door of a stock-car, which, being of ordinary construction, and well known, need not be particularly described here.

$A^1$ is a section of the swinging deck or platform in position, which is constructed of any kind of material of sufficient strength to support the weight which may be placed upon it, and which extends from the end of the car to the door of the same.

$A^2$ is the fellow-section of $A^1$, and is of the same dimensions and construction, but is hinged to the opposite side of the car, and is shown in its lowered position.

When the section $A^2$ is raised, and the beam $B^2$ is passed through, so that its advanced end will rest in the support $C^2$, on the side of the car opposite to the one on which it was entered, and the remaining beam, which may be necessary to the adequate support of this section of the deck, are in place, that portion of the deck which extends from the door to either end of the car is in position and ready for use.

I have described only one-half of the swinging portion of the deck, but, as the opposite half is in all respects identical, the description need not be repeated.

$B^2$ is one of the beams or supports of the deck, heretofore referred to, which is a timber of such depth and thickness as will sustain the deck and its load, say three inches in thickness by four inches in depth, which finds its bearings or supports in iron rests or sockets, fastened to the framework of the car, where it is held by a pin or bolt, which passes through the end thereof, and through the rest or socket.

$C^2$ is the socket or rest, above described, and is clearly shown in figs. 3 and 4 of the drawings, and also in fig. 1, where it appears in position.

$D^2$ is that portion of the deck which occupies the space opposite to and between the doors of the car. It is constructed in the form of a platform, the planks of which it is composed being held together by cleats, and its length being such that it will extend from the centre of one of the beams $B^2$ one side of the door to the centre of the one on the opposite side, at which points the swinging platform terminates.

$E^2$ are receptacles for that portion of the deck which fills the space opposite the doors of the car when in position, which are formed in or near the roof of the car, by attaching cleats thereto, which cleats have rabbets cut upon their upper edges, leaving their lower portions to project a distance sufficient to receive the deck $B^2$, which, when not in use, may be raised and slid into the position of the dotted red lines shown in fig. 1.

It is evident that various other plans may be adapted for receiving this portion of the deck in position when not in use, such as passing screw-bolts through it and into nuts inserted in the roof of the car, or they may be held in position by hooks entering into staples driven into the under sides of the deck, the hooks being screwed to the roof of the car. Of the various plans named, however, I prefer the former as being more convenient, and as affording the greatest facility for the speedy changing of this section of the deck from one position to the other.

It will be obvious that this section of the deck may, if desired, be carried, when not in use, in the receptacle under the central part of the car, where it is shown as being deposited by red dotted lines.

I have described the swinging portions of the platform as swinging downward from their point of suspension or attachment to the sides of the car, but the dotted lines in fig. 2 will show how they may, if desired, be swung up against the upper part of the car; but this, I think, will hardly be found desirable, as it would necessitate the cleaning of the deck before it could be swung in that direction, whilst the very act of dropping them downward secures the removal of any substance which may rest upon them while they remain in their elevated position.

I contemplate so constructing a car of this description that the swinging portion of the "upper deck," when swung or dropped down by the side of the car, shall constitute a portion of the siding, or what is termed a "box-car," the remaining portion, necessary to complete the closing up of the side of the car, (with the exception of the space occupied by the door,) being secured to the framework, and the whole so arranged that, when not in use as a stock-car, the same may be used for the transportation of such kinds of freight as are required to be carefully protected from injury by water, or from any other cause, which result may be accomplished by allowing that portion of the siding or covering of the car which is permanently attached to extend downward from the top only so far as to meet and form a joint with the swinging portion when dropped into its vertical position, and by providing a closed sliding door, to be used in place of the door of open construction, necessary when transporting animals.

It will be seen that that portion of siding which I have described as permanently attached to the sides of the car may, if desired, be constructed in the form of a swinging door, and be swung upward and fastened to the roof of the car.

I am aware that cars having a platform arranged upon rods, and so as to be raised, from a position about midway of the car, vertically, to a position near the roof of the same, have been the subject of patents. These I do not claim; but, having fully described my invention, and in what it consists,

What I claim as my invention, and desire to secure by Letters Patent, is—

1. A car, for the transportation of animals and other kinds of freight upon railroads, convertible from a double to a single-deck or platform car, and *vice versa*, by means of a swinging or dropping deck or platform, attached to the sides of said car, substantially as shown and described.

2. The removable section $D^2$, which occupies the central position between the sections $A^1 A^2 A^1 A^2$, substantially as shown and described.

3. The arrangement of devices, substantially such as are shown and described, for receiving and carrying the central portion of the deck when not in position for use.

4. The arrangement of the beams, and their rests or supports, with reference to the platforms or sections of the upper deck and the framework of the car, substantially as shown and described.

In testimony whereof, I have signed my name to this specification in the presence of two subscribing witnesses.

G. R. BLANCHARD.

Witnesses:
 WM. H. JONES,
 JOHN SMILEY.